United States Patent [19]

Vítovec et al.

[11] Patent Number: 4,874,409
[45] Date of Patent: Oct. 17, 1989

[54] EQUIPMENT FOR CONTINUOUS SEPARATION OF SMALL PARTICLES AND VAPOURS OF SUBLIMABLE COMPOUNDS

[75] Inventors: Jaroslav Vítovec; Jan Čermák; Jiří Smolík, all of Prague, Czechoslovakia

[73] Assignee: Ceskoslovenska akademie ved, Czechoslovakia

[21] Appl. No.: 294,288

[22] Filed: Jan. 6, 1989

[30] Foreign Application Priority Data

Jan. 18, 1988 [CS] Czechoslovakia ................... 332-88

[51] Int. Cl.⁴ .............................................. B01D 59/08
[52] U.S. Cl. .......................................... 55/267; 55/82; 55/320; 55/342
[58] Field of Search ................... 55/82, 267, 320, 342, 55/434, 269

[56] References Cited

U.S. PATENT DOCUMENTS 4,696,683 9/1987 Vítovec ................................. 55/82

Primary Examiner—Charles Hart
Attorney, Agent, or Firm—Leydig, Voit, & Mayer

[57] ABSTRACT

The equipment solves the problems of appropriate and simple construction and suitable especially for continuous separation of solid sublimable compounds from the gaseous mixture. The equipment consists of a desublimer 1 and separator 4 in which is situated a conical vessel 5 and the well 7. The principle of the invention is that between the outlet neck 6 of the conical vessel 5 and the well 7 is situated a filter 9 of a conical shape with the angles of wall inclination between 10° and 45°, whose upper end is connected with the outlet neck 6.

5 Claims, 1 Drawing Sheet

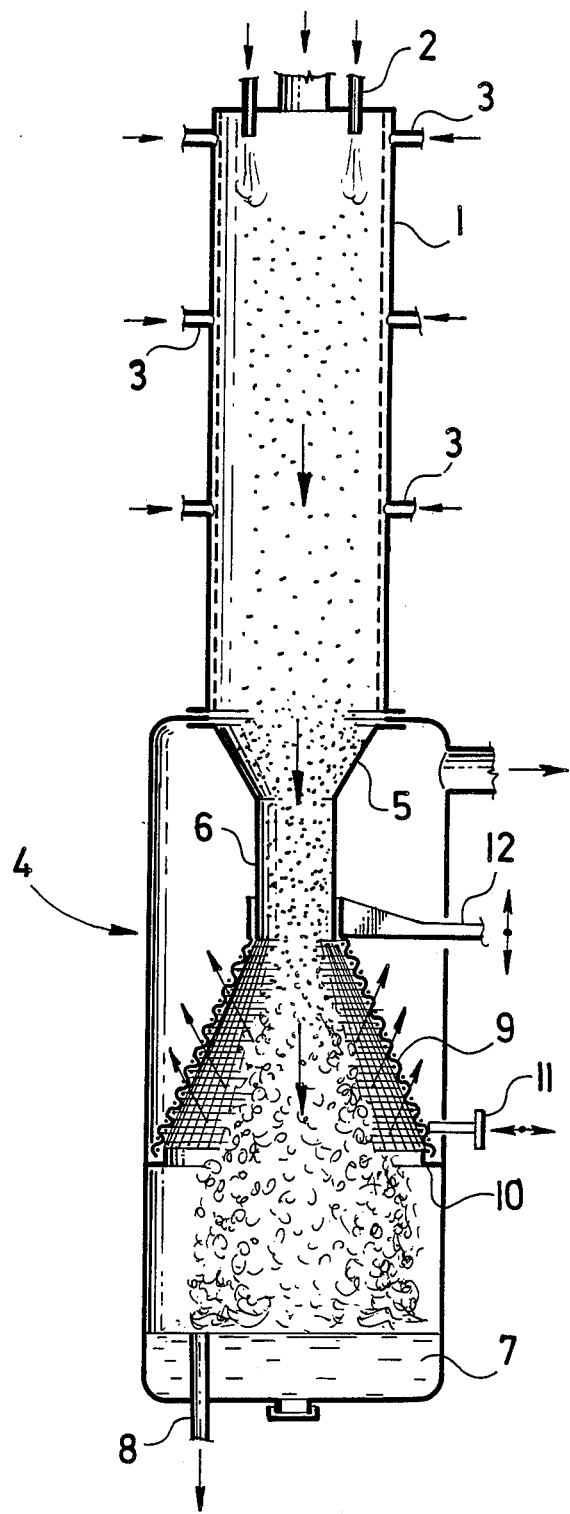

EQUIPMENT FOR CONTINUOUS SEPARATION OF SMALL PARTICLES AND VAPOURS OF SUBLIMABLE COMPOUNDS

The invention concerns the equipment for continuous separation of small particles and vapours of sublimable compounds at their separation from a mixture formed at desublimation of sublimable vapours in the desublimer.

At present known devices for separation of solid sublimable compounds are described in the U.S. Pat. No. 4,696,683 and in the Patent Application BRD No. DE 3602836 A 1. According to these patents to the desublimer is attached a separator in whose upper part is situated a vessel of conical shape whose larger cross section forms the inlet throat of the separator and the smaller cross section is equipped by an outlet throat which is the gate into a settling well situated in the lower part of the body of the separator. Ratio of cross sections of outlets of the desublimer and the outlet neck of the conical vessel is denoted by numbers 4 to 25. The upper part of the separator is connected with the filtration equipment which has one outlet for the gaseous mixture while the second outlet is connected with the receiver well of the separator.

The disadvantage of this equipment is the fact that the filtration equipment is located outside the separator which is complicating its construction and which is thus increasing the investment cost of the whole system.

The equipment for continuous separation of small particles and vapours of subliming compounds according to this invention consists of a desublimer to which is connected a separator in whose upper part is located a conical vessel whose smaller cross section is equipped with the outlet throat and in the bottom part of the separator is located a receiver well which is provided with a heating system and an outlet device. The principle of the invention, which removes the mentioned disadvantages, rests in the fact that between the outlet throat and the well is situated a filter of conical shape with angles 10° to 45° whose upper end is connected to the outlet throat. The bottom of the filter might be connected with the collar formed at the circumference of the internal wall of the separator. The filter can be made of wire network with mesh sizes of 0.1 to 10 mm or of expanded metal sheets with the length of diagonals of the mesh sizes up to 6×22 mm. The filter might be equipped with a knock element and a mechanism for blink shifting of the filter.

The principal advantage of the equipment according to this invention is simplicity of its design. Filtration equipment which was earlier situated outside the separator is now inside the separator. This has contributed toward reduced investment cost of the whole system.

The equipment according to this invention is demonstrated in the attached FIGURE, but which is not limiting the invention.

This FIGURE demonstrates that the equipment for continuous separation of small particles and vapours of sublimable compounds consists of a desublimer 1, equipped by nozzles 2 and inlets of air 3 toward the gas-permeable walls. To the desublimer is attached a separator 4, in whose upper part is situated a conical vessel 5, whose larger cross section forms the inlet throat of the separator 4 and the smaller cross section is equipped by an outlet throat 6. In the lower part of the separator 4 can be located a receiver well 7 which is equipped by a heating system and an outlet device 8. Between the outlet throat 6 and the well 7 is located a filter 9 conically shaped under the angle 10° to 45° whose upper part is connected to the outlet throat 6. The bottom part of the filter 9 sits down on the collar 10 formed on the circumference of the internal wall of the separator 4. The filter 9 is equipped with the knock element 11 and mechanism 12 for blink shifting of the filter 9.

Operation of the equipment can be described in the following way: After separation of agglomerated compact flakes of sublimable compounds the small particles entrained by the gaseous mixture are separated on the internal wall of the filter 9 inside the separator 4. Within about 20 seconds a layer forms which is not allowing particles to pass and causes that majority of vapours of sublimable compounds entrained by the gaseous mixture from the melt in the well 7 condense there. The layer is at max 10 mm thick and is not increasing further, with the additional catched product falling into the well 7. When the pressure drop on the layer reaches 300 to 600 Pa which is after 15 to 30 minutes the layer on the filter 9 is knocked down by the knock element 11 and the pressure is reduced to 100 Pa. On the external side of the filter 9 forms a fine layer of sublimable compounds perhaps of condensing vapours which passed through the filter 9 at the mass rate about 10 to 100 g/hr m² of separator 4 according to the velocity of the gaseous mixture and temperature of the surface of melt in the wall 7. This product is with time entrained by the mixture leaving the separator 4 or it can be by knocking down by blink shifting of the filter 9 during the mechanism 12 up and down within the range of height about 2 cm along the outlet neck 6 of the conical vessel 5 transported into the well 7 of the separator 4. The layer of subliming compounds on the surface of the melt in the well 7 also prevents the escape of vapours so that their loss is minimal and is reaching 0.2 to 1% by mass.

Equipment according to the invention can be advantageously applied especially at continuous separation of solid sompounds, such as phthalananhydride or naphthalene from gaseous mixtures.

What is claimed is:

1. Equipment for continuous separation of small particles and vapours of subliming compounds at their separation from a mixture formed after desublimation of vapours of subliming compounds in a desublimer to which is attached a separator in whose upper part is situated a conical vessel, whose larger cross section forms the outlet throat of the separator and whose smaller cross section is equipped with an outlet throat while in the bottom part of the separator is located a well, which is equipped with a heating system and an outlet device, wherein between the outlet throat (6) and the well (7) is located a filter (9) of conical shape with angles of walls 10° to 45°, whose upper end is attached to the outlet throat (6).

2. Equipment according to point 1, wherein the bottom of the filter (9) is sitting down on the collar (10) formed at the circumference of the internal wall of the separator (4).

3. Equipment according to point 1, wherein the filter (9) is made of metal mesh with the size of mesh 0.1 to 10 mm or of expanded metal sheets with the lenght of the diagonals of mesh sizes up to 6×22 mm.

4. Equipment according to point 1, wherein to the filter (9) is attached a knock element (11).

5. Equipment according to point 1, wherein to the filter (9) is attached a mechanism (12) for blink shifting of the filter (9).

* * * * *